United States Patent

Perry

[11] Patent Number: 5,752,746
[45] Date of Patent: May 19, 1998

[54] HUBCAP WITH VENTED CLOSURE

[75] Inventor: Paul S. Perry, Longview, Tex.

[73] Assignee: Stemco Inc., Longview, Tex.

[21] Appl. No.: 572,921

[22] Filed: Dec. 15, 1995

[51] Int. Cl.$^6$ ............................................. B60B 7/00
[52] U.S. Cl. ................................. 301/108.1; 301/108.4
[58] Field of Search ........................ 301/105.1, 108.1,
301/108.2, 108.3, 108.4; 384/462, 473;
184/5.1; 137/493.9, 512.4

[56] References Cited

U.S. PATENT DOCUMENTS

| | | |
|---|---|---|
| 2,351,874 | 6/1944 | Park . |
| 3,320,006 | 5/1967 | Cozzarin . |
| 3,342,204 | 9/1967 | Royce . |
| 3,460,874 | 8/1969 | Johnson . |
| 3,649,080 | 3/1972 | Molinare . |
| 3,948,147 | 4/1976 | Sauer et al. . |
| 4,181,145 | 1/1980 | Mitchell . |
| 4,624,286 | 11/1986 | Frohn . |
| 4,813,446 | 3/1989 | Silverwater et al. . |
| 5,125,428 | 6/1992 | Rauter . |
| 5,192,117 | 3/1993 | Kuck . |
| 5,215,312 | 6/1993 | Knappe et al. . |

*Primary Examiner*—Russell D. Stormer
*Attorney, Agent, or Firm*—Cummings & Lockwood

[57] ABSTRACT

A hubcap attached to a wheel wherein a chamber is formed between the hubcap and the wheel for housing a lubricating fluid for the associated wheel bearings. A vent passage extending through the hubcap is provided for relieving the pressure formed in the chamber. A first one way valve is positioned to cover the vent passage for allowing a flow of gases to exit the vent passage while preventing liquids and other contaminants from entering the vent passage. A porous material is mounted across an air inlet passage extending through the hubcap for allowing air to enter the chamber. A second one way valve is mounted across the air inlet passage between the chamber and the porous material to shield the outer surface of the porous material from exposure to lubricating fluid from the chamber.

22 Claims, 3 Drawing Sheets

HUBCAP WITH VENTED CLOSURE

BACKGROUND OF THE INVENTION

1. Technical Field

The present invention relates to a hubcap and more particularly to a hubcap for use with automatic bearing lubrication systems.

2. Background Art

In translational and rotational devices generally and particularly on wheels of most trucks and trailers, hubcaps are used to maintain the oil or grease in the wheel bearings. In addition, hubcaps prevent external contaminants which may substantially shorten the life of the wheel bearings from coming into contact with the wheel bearings. The interior of the hub or wheel assembly is filled with oil or grease so that the wheel bearings are lubricated. Friction resulting from the rotating bearings heats the lubricant and the air space within the assembly causing the enclosed lubricant and air to expand. The increased pressure in the assembly covered by the hubcap caused by the expanding lubricant and air often becomes great enough to damage the seal between the hubcap and the wheel or even the hubcap itself, resulting in leakage of lubricant from the hubcap wheel assembly and thus causing insufficient bearing lubrication.

Accordingly, it has been necessary to incorporate a venting device in the hubcap to relieve the pressure from the interior of the hubcap. For example, U.S. Pat. Nos. 3,460,824 and 3,649,080 disclose movable valve elements positioned in a vent passage formed in the hubcap for permitting air to pass through the vent in order to reduce internal pressure while excluding contaminants from entering the hubcap. However, these movable valve vent devices permit lubricant flow out of the hubcap during venting resulting in excessive loss of lubricant over time. In addition, these devices are often unduly complicated because they utilize numerous parts and, therefore, are expensive to manufacture.

U.S. Pat. Nos. 5,192,117 to Kuck and 3,320,006 to Cozzarin both disclose devices for venting a bearing housing while preventing the flow of lubricant from the bearing housing. The Kuck patent discloses a hubcap with a vent including a vent passage filled with a cylindrical gas permeable plug of bronze porous material which permits air to pass therethrough but which prevents water and other contaminants from passing therethrough. The Cozzarin patent discloses a similar plug type vent device. Both the plug type vent devices of Kuck and Cozzarin appear to be secured in a vent passage formed in the hubcap via a interference or press fit which requires precision machining to ensure the low tolerances necessary for a secure fit. However, precision machining also results in increased manufacturing costs. Also the outer surface of these vent plugs are directly exposed to the outside work environment while the inner surface is covered with lubricant which adheres thereto. The combination of impinged lubricant on the inner surface and an outer surface blocked by grit and other contaminants severely hinders the venting action of the porous material.

Therefore, as can be seen from the foregoing, there is a need for a hubcap with a vent which permits air to pass therethrough but which prevents the passage of water and other contaminants, wherein the venting device can be simply and inexpensively manufactured and secured to the hubcap.

SUMMARY OF THE INVENTION

It is a primary object of the present invention to overcome the aforementioned shortcomings associated with the prior art by providing a hubcap with a vent device which is simple to install, inexpensive to manufacture yet effective in operation.

Another object of the present invention is to provide a hubcap with a vent which prevents the loss of lubricant from the hubcap in order to ensure that the wheel bearings are lubricated throughout the use of the bearings.

Yet another object of the present invention is to provide a hubcap having a venting structure to relieve the pressure developed within the hubcap while preventing water and other contaminants from entering the hubcap.

Another object of the present invention is to provide a vented hubcap for a wheel which maintains the air flow through the vent substantially free from blockage by contaminants throughout operation of the wheel.

It is still another object of the present invention to provide a hubcap with a vent covered by porous material which includes an outer enclosure cap encasing the porous material in order to shield the porous material from grit and other contaminants and an inner valve to shield the porous material from oil and grease contained within the hubcap.

Yet another object of the present invention is to provide a hubcap with a vent covered with a porous material in combination with a dual opposed valve structure to permit gas to escape from the hubcap and air to enter while preventing oil from impinging on the interior surface of the porous material.

These as well as additional objects and advantages of the present invention are achieved by providing a hubcap attached to a wheel wherein a chamber is formed between the hubcap and the wheel for housing a lubricating fluid for the associated wheel bearings. A first or inlet passage extending through the hubcap is provided for permitting air to flow into the chamber and a second or vent passage closed by a valve is provided for relieving the pressure formed in the chamber. The inlet passage is covered by a porous material which allows a flow of air to enter the wheel assembly through the hubcap, and in the vent passage is a two part valve including a vent valve and an air inlet valve shielding the porous material from lubricating fluid within the chamber. An enclosure cap encases the porous material and vent valve in order to shield them from external contaminants thereby preventing blockage of the vent passage and inlet passage due to the accumulation of grit and other contaminants. The enclosure cap further has at least one port to accommodate air flow to the porous material and at least one port to exhaust pressure from the vent valve.

DETAILED DESCRIPTION OF THE PREFERRED EMBODIMENT

Figure 1:
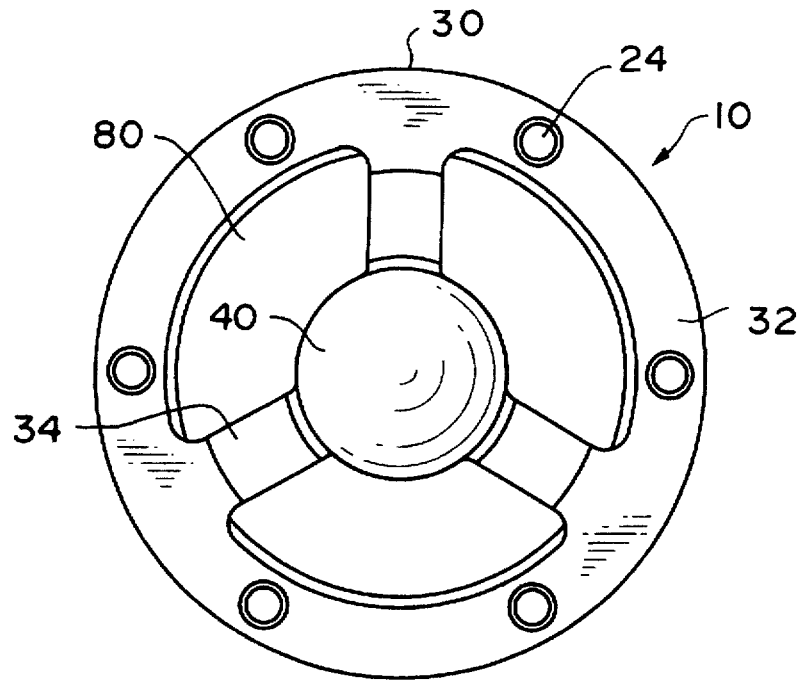
FIG. 1 is a plan view of the vented hubcap of the present invention.
Figure 2:
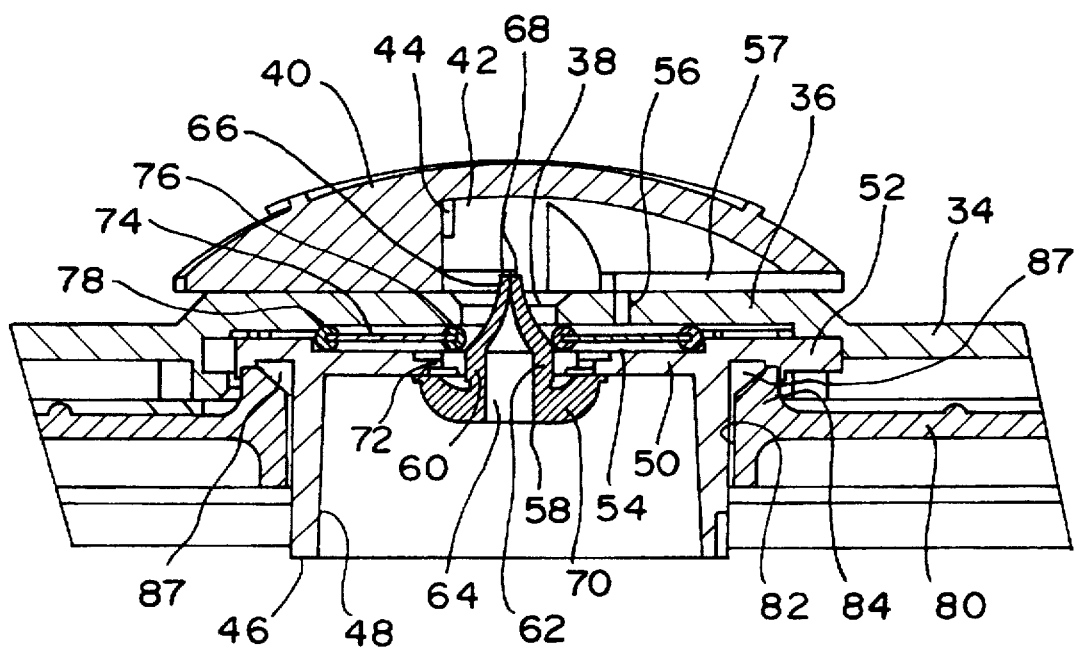
FIG. 2 is a sectional view of a portion of the hub cap of FIG. 1.
Figure 3:
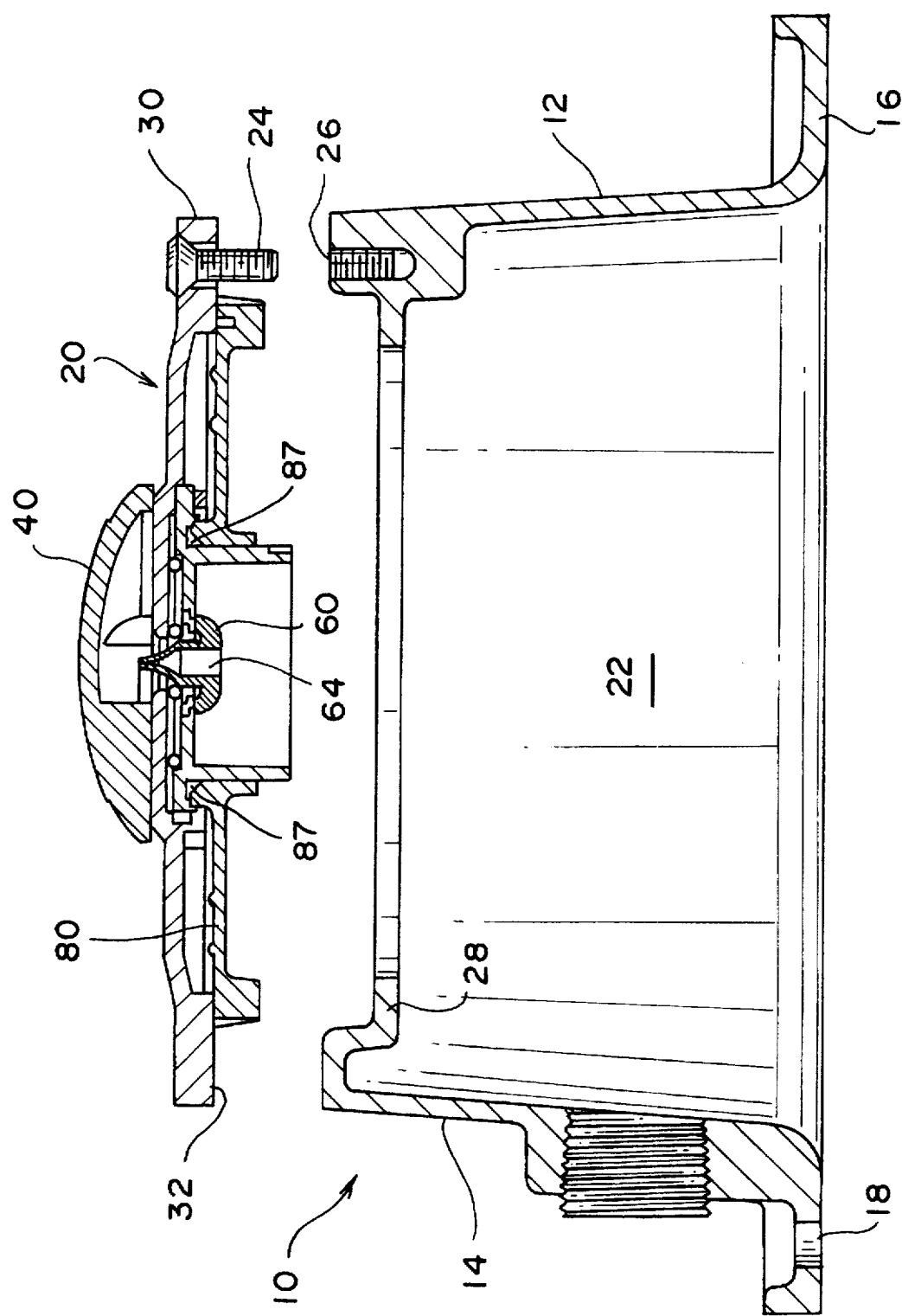
FIG. 3 is an exploded sectional view of the hubcap with vented closure of the present invention.

Referring now to FIGS. 1-3, the vented hubcap 10 of the present invention is illustrated for conventional use on a truck, tractor trailer, or other vehicle having wheels which are each rotatably connected to an end of an axle via bearings. Vented hubcap 10 mounts onto a wheel and finctions to contain lubricant for lubricating the bearings during operation of the wheel and bearings while venting the hubcap interior to atmosphere. This avoids damage to the hubcap and associated seal caused by excessive positive and negative pressure in the hubcap. In addition, vented hubcap 10 prevents external contaminants such as grit and water from entering the hubcap and from blocking the vent flow path.

As shown in FIG. 3, the hubcap 10 includes an open ended body 12 having a sidewall 14 which is generally cylindrical in shape and includes a mounting flange 16 at one end having apertures 18 for receiving bolts or the like which secure the hubcap 10 to the vehicle wheel. The opposite end of the body 12 is closed by a vented closure assembly 20, and the body defines a chamber 22 opposite the closure assembly for housing lubrication fluid. Once the hubcap 10 is mounted, the wheel closes the open end of chamber 22 to sealingly retain the lubricating fluid for lubricating the wheel bearings. The vented closure assembly 20 may be formed integrally with the body 12, but normally it is formed as a separate unit which is secured in place on the body 12 as by bolts 24 received in threaded apertures 26 or by other known attachment means. The body 12 includes an annular flange 28 which extends laterally inwardly from the sidewall 14 to support and seat the closure assembly 20.

The vented closure assembly 20 includes a unitary outer closure unit 30 having an outer ring 32 which receives the bolts 24, and radial spokes 34 extending from the outer ring to a central hub. A central vent opening 38 extends through the central hub 36 which is covered by an enclosure cap 40 mounted on the central hub 36. The enclosure cap includes a central cap chamber 42 positioned over and in communication with the central opening 38, and the central opening and cap chamber are connected to the atmosphere external of the hubcap by one or more vent passages 44.

Secured to the outer closure unit 30 beneath the central hub 36 is a cup shaped unit 46 having a circular sidewall 48 which is closed at one end by an endwall 50. Thus cup shaped unit includes a raised, annular flange 52 to engage the outer closure unit 30 and to define a space 54 between the endwall 50 and the central hub 36. This space 54 is connected to atmosphere by one or more inlet vent passages 56 extending through the hub 36 to connect the space 54 to one or more air inlet vents 57 formed in the enclosure cap.

A large outlet vent opening 58 is formed to extend through the center of the endwall 50 beneath the central opening 38, and a unitary combination umbrella/duckbill check valve 60 is secured and sealed within the outlet vent opening 58. This valve 60 is formed of rubber or other suitable flexible material and includes a valve body 62 having a central passage 64 which opens at one end into the chamber 22 when the closure assembly 20 is secured to the body 12. The opposite end of the valve body tapers inwardly to form a duckbill valve 66 which extends through the central opening 38 and exhausts pressure from the chamber 22 into the central cap chamber 42. The flexible flaps 68 of the duckbill valve part to exhaust pressure from the central passage 64, but are resiliently closed to prevent air or contaminants from entering the central passage. Also, a duckbill valve is more resistant to the passage of lubricant past the flaps 68 than is a multipart mechanical valve.

A flexible umbrella valve 70 extends annularly and laterally from the open end of the central passage 64 and curves toward the duckbill valve to seat against the endwall 50. This umbrella valve closes one or more air inlet passages 72 which pass from beneath the umbrella valve through the endwall 50 to the space 54. The umbrella valve will prevent pressure or lubricant from the chamber 22 from entering the air inlet passages 72, but will flex outwardly away from the endwall 50 enough to permit air from the air inlet passages to enter the chamber.

Mounted within the space 54 to extend from the valve body 62 across the extent of the space is a porous hydrophobic filter 74 which is sealed to the valve body by an O ring seal 76 and to the central hub 36 and annular flange 52 by an O ring seal 78. The filter 74 is formed of known materials such as a powdered metal disc or a nonmetallic porous membrane of polytetrafluoroethylene (PTFE) having a pore size in the microporous size range which will permit the passage of air while preventing water and contaminants from passing therethrough into the interior of the wheel hub (e.g., chamber 22) through air passages 72. Under certain circumstances, filter 74 may be called upon to restrict the flow of a contaminant such as oil through air passages 72; in this event the filter may be formed of a porous oleophobic material that will inhibit the passage of both oil and water.

The closure assembly is completed by a closure disc 80 which may be of metal but which is often of shock resistant transparent material to permit visual observation of the interior of the chamber 22. The outer edge of the closure disc is sealed to annular flange 28, and retained by the outer ring 32, while the central portion of the closure disc is provided with an opening 82 which fits over the sidewall 48 of the cup shaped unit 46. An annular mounting flange 84 formed adjacent to the opening 82 retains a deformable/resilient elastomeric seal 87 underneath the flange 52 of the cup shaped unit 46, in a space defined by flange 84, flange 52 and the outer periphery of cup-shaped unit 46.

In the operation of the vented hubcap 10, the combination umbrella/duckbill check valve 60 provides a unitary body with two oppositely directed valves. The duckbill valve 66 permits pressure to pass from the chamber 22 into the central cap chamber 42 and then to atmosphere through vent passages 44. The oppositely directed umbrella valve 70 operates to prevent lubricant and internal pressure from reaching the filter 74 through the air inlet passage 72. Conversely, the duckbill valve prevents air, water and contaminants from entering the central passage 64 and the chamber 22, while the umbrella valve 70 permits air to enter the chamber 22 from the air inlet vent 57, inlet vent passages 56, filter 74 and air inlet passages 72. The filter 74 will exclude water and other contaminants.

Figure 4:
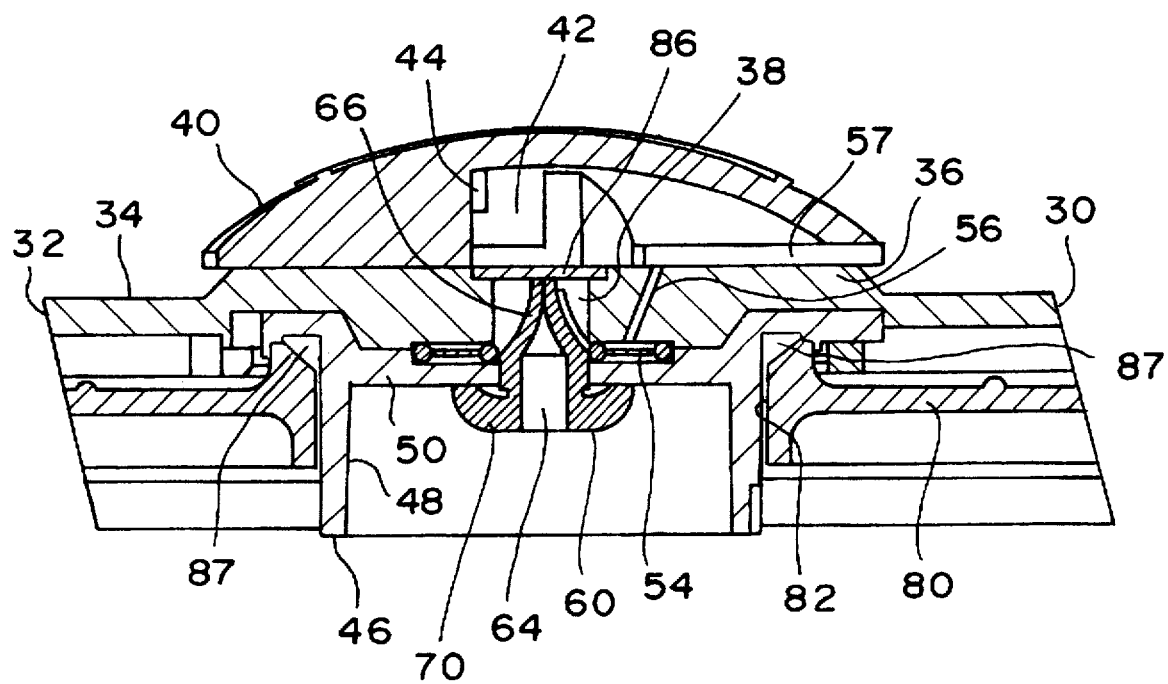
FIG. 4 is a sectional view of a second embodiment of a portion of the vented hubcap of the present invention.

For most applications, the chamber 22 is less than half filled with lubricant, and any amount of lubricant which might reach the duckbill valve 66 and escape therethrough is negligible. However, in the embodiment of the vented hubcap 10 shown in FIG. 4, the combination umbrella/duckbill check valve 60 is positioned so that the duckbill valve 66 exhausts through a second filter 86 formed of a porous oleophobic material. This second filter lightly engages the duckbill valve and permits the passage of pressure from the duckbill valve into the cap chamber 42 while preventing the passage of any significant amount of lubricant from the duckbill valve.

As can be seen from the foregoing, a hubcap formed in accordance with the present invention will relieve pressure developed within the hubcap by venting while preventing water and other contaminants from entering the hubcap and contacting the wheel bearings thus extending the useful life of the lubricant and bearings. Moreover, by forming the hubcap in accordance with the present invention with oppositely directed duckbill and umbrella valves, lubricant is prevented from accumulating on the surface of the air venting filter structure thereby maintaining the air flow vent path and ensuring proper venting of the hubcap.

What is claimed is:

1. A hubcap for covering lubricated wheel bearings in a wheel comprising:

a hubcap body assembly member attachable to the wheel for covering the wheel bearings, said hubcap body member defining a chamber between said hubcap body assembly and the wheel for housing a fluid for lubricating the wheel bearings;

a vent passage extending through said hubcap body assembly to said chamber for permitting gases to flow from said chamber;

a first one way valve mounted on said body assembly to close said vent passage, said first one way valve permitting gasses to flow from said chamber through said vent passage while preventing liquids and other contaminants from flowing into said chamber;

an inlet passage extending through said hubcap body assembly to said chamber for permitting air to flow into said chamber;

a porous material member mounted on said hubcap body assembly to cover said inlet passage for permitting a flow of air to pass through said porous material member, said porous material member preventing liquids and other contaminants from passing therethrough;

and a second one way valve mounted on said hubcap body assembly to close said inlet passage between said chamber and said porous material member, said second one way valve permitting air to flow from said porous material member into said chamber while preventing lubricating fluid within said chamber from reaching said porous material member.

2. The hubcap of claim 1 wherein said first and second one way valves are opposed valves formed as a unitary valve unit.

3. The hubcap of claim 2 wherein said unitary valve unit is mounted in said vent passage.

4. The hubcap of claim 2 wherein said inlet passage is formed closely adjacent to said vent passage, said unitary valve unit including a valve body having a central valve passage formed therein, said first one way valve being formed by a duckbill valve on said valve body at a first end of said central valve passage to vent gasses passing through said central valve passage, said central valve passage having a second end spaced from said first end which opens into said chamber, said second one way valve being formed by an umbrella valve extending laterally from said valve body and annularly of the second end of said central valve passage.

5. The hubcap of claim 2 wherein said first one way valve is a duckbill valve which opens in response to pressure to permit gasses to flow outwardly from said chamber.

6. The hubcap of claim 2 wherein said second one way valve is a resilient valve responsive to air pressure to permit air to flow into said chamber.

7. The hubcap of claim 6 wherein said first one way valve is a duckbill valve which opens in response to pressure to permit gasses to flow outwardly from said chamber.

8. The hubcap as defined in claim 1, wherein said porous material member is an expanded membrane of polytetrafluoroethylene with a pore size in the microporous range.

9. The hubcap as defined in claim 1, wherein said porous material member is hydrophobic.

10. The hubcap as defined in claim 4, wherein said porous material member is an expanded membrane of polytetrafluoroethylene with a pore size in the microporous range.

11. A venting closure assembly for attachment to a hubcap body member attachable to a vehicle wheel to close a lubricant containing chamber in the hubcap body member comprising:

a closure body assembly;

vent means formed in said closure body assembly and operable to connect said lubricant containing chamber to atmosphere external to said venting closure assembly when said venting closure assembly is attached to said hubcap body member;

said vent means including an air inlet vent having an innermost end which opens into said lubricant containing chamber when said venting closure assembly is attached to said hubcap body member and a vent passage;

a porous material member mounted on said closure body assembly to extend across said air inlet vent, said porous material member being spaced from said innermost end and permitting a flow of air to pass from atmosphere therethrough while preventing the passage of liquids and other contaminants;

a first one way valve mounted on said closure body assembly to close the innermost end of said air inlet vent, said one way valve opening in response to an air flow through said porous material member; and a second one way valve mounted on said closure body assembly to close said vent passage.

12. The venting closure assembly of claim 11 wherein said porous material member is an expanded membrane of polytetrafluoroethylene with a pore size in the microporous range, said membrane being hydrophobic.

13. The venting closure assembly of claim 11 wherein said porous material member is an expanded membrane of polytetrafluoroethylene with a pore size in the microporous range, said membrane being oleophobic.

14. The venting closure assembly of claim 11 wherein said closure body assembly includes an outer closure unit having a central hub area, a cap secured to said central hub area, said air inlet vent extending through said central hub area and said cap.

15. The venting closure assembly of claim 14 wherein said closure body assembly includes at least one transparent window to permit observation of said lubricant containing chamber when said venting closure assembly is attached to said hubcap body member.

16. The venting closure assembly of claim 14 wherein said second one way valve is opposed to said first one way valve to permit gasses to flow from said lubricant containing chamber through said vent passage to atmosphere when said venting closure assembly is attached to said hubcap body member while preventing liquids and other contaminants from flowing from atmosphere through said vent passage.

17. The venting closure assembly of claim 16 wherein said vent passage extends through said central hub area and said cap.

18. The venting closure assembly of claim 17 wherein said first and second one way valves are formed as a unitary valve unit.

19. The venting closure assembly of claim 18 wherein said unitary valve unit is mounted in said vent passage.

20. The venting closure assembly of claim 19 wherein said inlet passage is formed closely adjacent to said vent passage in said outer closure section, said unitary valve unit including a valve body having a central valve passage formed therein, said second one way valve being formed by a duckbill valve on said valve body at a first end of said central valve passage to vent gasses passing through said central valve passage, said central valve passage having a second end spaced from said first end, said second one way valve being formed by an umbrella valve extending laterally from said valve body and annularly of the second end of said central valve passage.

21. The venting closure assembly of claim 11 wherein said vent means includes a vent passage formed in said closure body assembly, a second one way valve formed unitary with said first one way valve, said second one way valve being opposed to said first one way valve to permit gasses to flow from said lubricant containing chamber through said vent passage to atmosphere when said venting closure assembly is attached to said hubcap body member while preventing liquids and other contaminants from flowing from atmosphere through said vent passage.

22. The venting closure assembly of claim 21 wherein said inlet passage is formed closely adjacent to said vent passage in said outer closure section, said unitary valve unit including a valve body having a central valve passage formed therein, said second one way valve being formed by a duckbill valve on said valve body at a first end of said central valve passage to vent gasses passing through said central valve passage, said central valve passage having a second end spaced from said first end, said second one way valve being formed by an umbrella valve extending laterally from said valve body and annularly of the second end of said central valve passage.

* * * * *